(12) United States Patent
Susnjara

(10) Patent No.: US 12,343,929 B2
(45) Date of Patent: Jul. 1, 2025

(54) APPARATUS AND METHODS FOR FABRICATING COMPONENTS

(71) Applicant: Thermwood Corporation, Dale, IN (US)

(72) Inventor: Kenneth Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 18/780,831

(22) Filed: Jul. 23, 2024

(65) Prior Publication Data

US 2024/0375344 A1  Nov. 14, 2024

Related U.S. Application Data

(60) Continuation of application No. 18/497,646, filed on Oct. 30, 2023, now Pat. No. 12,083,734, which is a continuation of application No. 17/805,427, filed on Jun. 3, 2022, now Pat. No. 11,850,789, which is a continuation of application No. 17/541,050, filed on
(Continued)

(51) Int. Cl.

| | |
|---|---|
| *B29C 64/106* | (2017.01) |
| *B29C 48/18* | (2019.01) |
| *B29C 64/00* | (2017.01) |
| *B29C 64/194* | (2017.01) |
| *B29C 64/20* | (2017.01) |
| *B29C 64/393* | (2017.01) |
| *B33Y 10/00* | (2015.01) |
| *B33Y 30/00* | (2015.01) |
| *B33Y 50/02* | (2015.01) |
| *B29C 64/245* | (2017.01) |
| *B29K 101/12* | (2006.01) |
| *B33Y 50/00* | (2015.01) |

(52) U.S. Cl.
CPC ............ *B29C 64/106* (2017.08); *B29C 48/18* (2019.02); *B29C 64/00* (2017.08); *B29C 64/194* (2017.08); *B29C 64/20* (2017.08); *B29C 64/393* (2017.08); *B33Y 10/00* (2014.12); *B33Y 30/00* (2014.12); *B33Y 50/02* (2014.12); *B29C 64/245* (2017.08); *B29K 2101/12* (2013.01); *B33Y 50/00* (2014.12)

(58) Field of Classification Search
CPC ..... B29C 64/393; B29C 64/106; B29C 64/00; B29C 64/20; B29C 64/194; B29C 48/18; B29C 64/245; B33Y 10/00; B33Y 30/00; B33Y 50/02; B33Y 50/00; B29K 2101/12
See application file for complete search history.

(56) References Cited

U.S. PATENT DOCUMENTS 4,264,278 A    4/1981  Weingart
5,088,187 A *  2/1992  Takata ............... H05K 13/0413
                                            29/714
(Continued)

OTHER PUBLICATIONS

International Search Report and Written Opinion issued in International Application No. PCT/US2017/016840, dated May 24, 2017 (15 pages).

*Primary Examiner* — Christina A Johnson
*Assistant Examiner* — Kelsey C Grace
(74) *Attorney, Agent, or Firm* — Bookoff McAndrews, PLLC

(57) ABSTRACT

An additive manufacturing method for fabricating a component having a surface substantially free of imperfections may include providing a mold having a configuration corresponding to the component, and depositing a material on at least one surface of the mold to fabricate the component having the surface substantially free of imperfections.

28 Claims, 7 Drawing Sheets

Related U.S. Application Data

Dec. 2, 2021, now Pat. No. 11,376,778, which is a continuation of application No. 17/172,845, filed on Feb. 10, 2021, now Pat. No. 11,220,097, which is a continuation of application No. 16/900,127, filed on Jun. 12, 2020, now Pat. No. 10,940,681, which is a continuation of application No. 16/661,267, filed on Oct. 23, 2019, now Pat. No. 10,723,116, which is a continuation of application No. 16/415,333, filed on May 17, 2019, now Pat. No. 10,486,413, which is a division of application No. 15/062,602, filed on Mar. 7, 2016, now Pat. No. 10,336,050.

(56) References Cited

U.S. PATENT DOCUMENTS

| | | | |
|---|---|---|---|
| 6,558,146 | B1 | 5/2003 | Shah et al. |
| 7,169,343 | B1* | 1/2007 | Mills ............... B29C 70/865 |
| | | | 264/257 |
| 7,731,816 | B2 | 6/2010 | Oldani et al. |
| 7,810,539 | B2 | 10/2010 | Mischler et al. |
| 8,151,854 | B2 | 4/2012 | Oldani |
| 8,534,338 | B2 | 9/2013 | Oldani et al. |
| 8,954,180 | B2 | 2/2015 | Oldani |
| 2002/0111707 | A1 | 8/2002 | Li et al. |
| 2006/0158456 | A1 | 7/2006 | Zinniel et al. |
| 2007/0044899 | A1 | 3/2007 | Tingley |
| 2008/0006017 | A1 | 1/2008 | Rindels |
| 2008/0223517 | A1 | 9/2008 | Kaltenborn et al. |
| 2010/0200168 | A1 | 8/2010 | Oldani et al. |
| 2013/0089642 | A1 | 4/2013 | Lipson et al. |
| 2013/0174969 | A1 | 7/2013 | Karb et al. |
| 2014/0060732 | A1 | 3/2014 | Shair et al. |
| 2014/0061974 | A1 | 3/2014 | Tyler et al. |
| 2014/0328963 | A1* | 11/2014 | Mark .................. B33Y 50/02 |
| | | | 425/143 |
| 2014/0367031 | A1 | 12/2014 | Ufer et al. |
| 2015/0165690 | A1 | 6/2015 | Tow |
| 2018/0050502 | A1 | 2/2018 | Oldani |

* cited by examiner

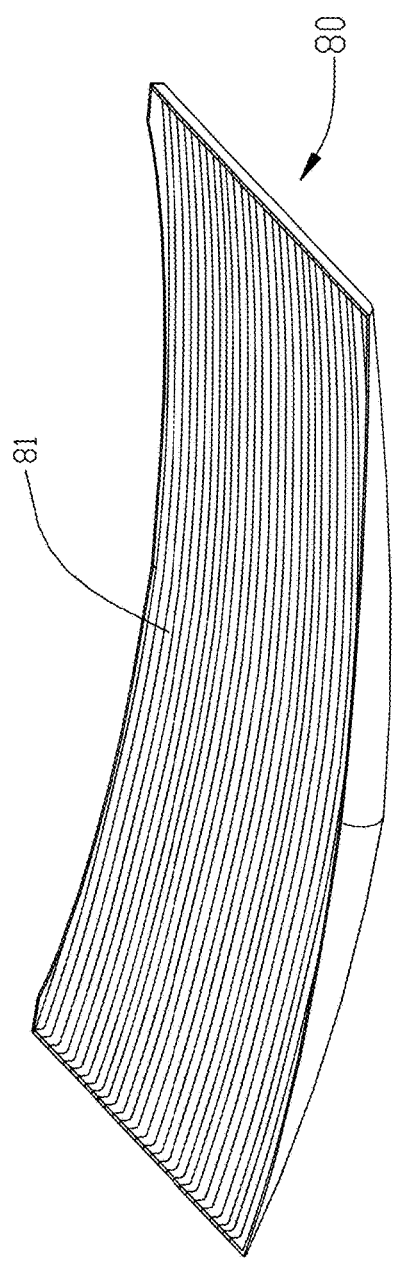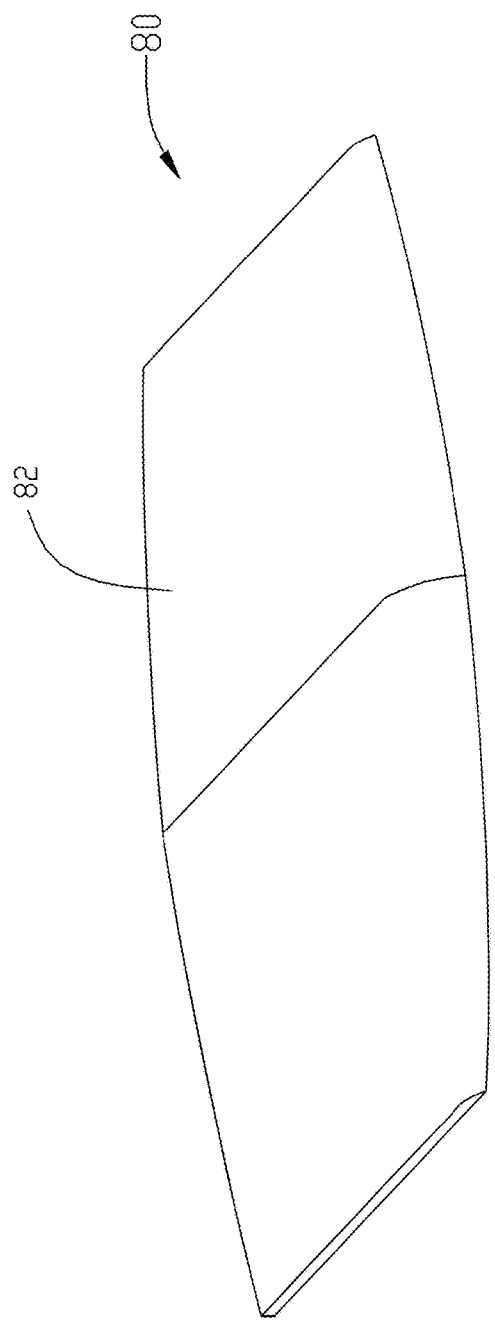

APPARATUS AND METHODS FOR FABRICATING COMPONENTS

CROSS-REFERENCE TO RELATED APPLICATIONS

This patent application is a continuation of and claims the benefit of priority to U.S. application Ser. No. 18/497,646, filed on Oct. 30, 2023, which is a continuation of U.S. application Ser. No. 17/805,427, filed on Jun. 3, 2022, now issued as U.S. Pat. No. 11,850,789, which is a continuation of U.S. application Ser. No. 17/541,050, filed on Dec. 2, 2021, now issued as U.S. Pat. No. 11,376,778, which is a continuation of U.S. application Ser. No. 17/172,845, filed on Feb. 10, 2021, now issued as U.S. Pat. No. 11,220,097, which is a continuation of U.S. application Ser. No. 16/900,127, filed on Jun. 12, 2020, now issued as U.S. Pat. No. 10,940,681, which is a continuation of U.S. application Ser. No. 16/661,267, filed on Oct. 23, 2019, now issued as U.S. Pat. No. 10,723,116, which is a continuation application of U.S. application Ser. No. 16/415,333, filed on May 17, 2019, now issued as U.S. Pat. No. 10,486,413, which is a divisional application of U.S. application Ser. No. 15/062,602, filed on Mar. 7, 2016, now issued as U.S. Pat. No. 10,336,050, the entireties of which are hereby incorporated by reference.

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, which may be referred to as 3D printing manufacturing techniques or processes.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including freeform fabrication, 3D printing, rapid prototyping/tooling, etc. Additive manufacturing techniques are capable of fabricating complex components from a wide variety of materials. Generally, a freestanding object can be fabricated from a computer-aided design (CAD) model.

A particular type of additive manufacturing, or 3D printing, technique and process generally includes forming and extruding a bead of flowable material (e.g., molten thermoplastic), applying such bead of material in a strata of layers to form a facsimile of an article, and machining such facsimile to produce an end product. Such a process is generally achieved by means of an extruder mounted on a computer numeric controlled (CNC) machine with controlled motion along at least the X, Y, and Z-axes. In some cases, the flowable material, such as, e.g., molten thermoplastic material, may be infused with a reinforcing material (e.g., strands of fiber) to enhance the material's strength. The flowable material, while generally hot and pliable, may be deposited upon a substrate (e.g., a mold), pressed down or otherwise flattened to some extent, and leveled to a consistent thickness, preferably by means of a tangentially compensated roller mechanism. The flattening process may aid in fusing a new layer of the flowable material to the previously deposited layer of the flowable material. In some instances, an oscillating plate may be used to flatten the bead of flowable material to a desired thickness, thus effecting fusion to the previously deposited layer of flowable material. The deposition process may be repeated so that each successive layer of flowable material is deposited upon an existing layer to build up and manufacture a desired component structure. When executed properly, the new layer of flowable material may be deposited at a temperature sufficient enough to allow new layer of flowable material to melt and fuse with a previously deposited layer of flowable material, thus producing a solid part.

While the aforementioned process achieves a near net shape much faster than depositing down a large number of very thin layers, a surface milling or other finishing operation is required to achieve the final net shape of the article, since it is deposited in stepped layers of tamped, extruded material. Such milling or finishing generally is accomplished using a rapidly spinning cutting tool with a round shaped tip, requiring numerous passes over the surface of the article, shifting over a small distance after each pass to generate the desired surface finish. In order to achieve a smooth surface, the amount the tool path is shifted after each pass must be relatively small; necessitating a large number of passes, which in turn requires considerable time to complete. While this approach may be satisfactory for a single item or a prototype part, it is less desirable for the production of multiple identical parts.

In view of the foregoing, the present disclosure provides systems and methods for producing articles from thermoplastic or flowable material using additive manufacturing techniques, which can generate multiple articles that are dimensionally accurate, and replicate the desired shape and surface features in less time, less effort, and reduced cost. Consequently, the present disclosure provides aspects of methods and apparatus for producing dimensionally accurate articles, which embody surface properties of sufficient quality, so as to negate the need for finishing operations.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects.

In one embodiment, an additive manufacturing method for fabricating a component having a surface substantially free of imperfections may include providing a mold having a configuration corresponding to the component, and depositing a material on at least one surface of the mold to fabricate the component having the surface substantially free of imperfections.

Embodiments of the additive manufacturing method may include one or more of the following features: the at least one surface of the mold may define a cavity in the mold, and the at least one surface may include a concave or convex configuration; the at least one surface may be processed to resist adhesion of the material to the at least one surface; the surface substantially free of imperfections may be formed without a finishing step; the mold may be configured to control a cooling rate of the material deposited on the at least one surface of the mold; the step of depositing the material on the at least one surface of the mold may include extruding the material onto the at least one surface from a nozzle; the at least one surface may include a plurality of curves, and the nozzle may be configured for movement relative to the at least one surface such that a centerline of the nozzle remains perpendicular to a tangent plane for each curve of the plurality of curves; the nozzle may be configured to translate along a first axis, a second axis perpendicular to the first axis, and a third axis orthogonal to the first and second axes, and wherein the nozzle may be configured to rotate in a plane defined by the first and second axes; depositing the material on the at least one surface of the mold may include depositing a plurality of material beads adjacent to one another; the material may include a thermoplastic having a reinforcing material therein; the reinforcing material may include strands of fiber; depositing the material on the at least one surface of the mold may include fusing the material to an adjacent previously deposited bead of material; the nozzle may be part of a programmable computer numeric control (CNC) machine; and depositing the material on the at least one surface of the mold may include depositing the material in a pattern, wherein the pattern is based on a digital representation of the component.

In another embodiment, an additive manufacturing system for fabricating a component having a surface substantially free of imperfections may include a programmable computer numeric control (CNC) machine configured to extrude a flowable material. The additive manufacturing system may further include a mold having a cavity defining at least one surface for receiving a plurality of beads of the flowable material.

Embodiments of the additive manufacturing method may include one or more of the following features: the computer numeric control (CNC) machine may be configured to deposit the flowable material in a pattern based on a digital representation; the programmable computer numeric control (CNC) machine may include a nozzle for extruding the flowable material, and wherein the nozzle may be moveable along a first axis, a second axis perpendicular to the first axis, and a third axis orthogonal to the first and second axes, and wherein the nozzle may be configured to rotate in a plane defined by the first and second axes; the at least one surface may include a plurality of curves, and wherein the nozzle may be configured for movement relative to the at least one surface such that a centerline of the nozzle remains perpendicular to a tangent plane for each curve of the plurality of curves; the mold may include at least one heating element configured to control a rate of cooling of the flowable material; and the material may include a thermoplastic.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

FIG. 7A is a perspective view of an exemplary completed component formed in the mold of FIG. 4, illustrating the application side of the component; and FIG. 7B is another view of the FIG. 7A component, showing the inverse side of the component, the surface of which is replicated substantially without objectionable surface imperfections.

DETAILED DESCRIPTION

The present disclosure is drawn to, among other things, methods and apparatus for fabricating multiple components via additive manufacturing or 3D printing techniques. More particularly, the methods and apparatus described herein produce components having at least one surface substantially without (or free of) objectionable imperfections, thereby eliminating the need for additional finishing processes during manufacturing. Those of ordinary skill in the art will understand that a surface substantially without (or free of) objectionable imperfections may be a surface ready for use or delivery to a consumer without needing any further processing, such as, e.g., machining, sanding, grinding, etc., to, e.g., remove the imperfections.

In one aspect, fabrication of components having at least one surface substantially without objectionable imperfections is achieved by providing an open face mold of substantial and stable substructure, of a material that can tolerate a heated thermoplastic material, and upon which layers of flowable material may be deposited and thus stabilized. Such a mold would have one or more of a concave or convex surface that is the inverse of a surface of the article to be fabricated or otherwise replicated. In forming such an article, instead of depositing material in flat, horizontal layers as is traditionally done in the additive manufacturing process, material is deposited onto the surface of the open mold as the centerline of the application nozzle is maintained in substantially perpendicular alignment with the variable tangent plane of the contoured surface. Such a process requires the use of a CNC machine with controlled motion along the X, Y, and Z-axes, as well as an articulated application head with controlled rotational displacement about both the vertical and horizontal axes, essentially providing a flexible head at the output of the extruder through which the flowable material may be deposited upon a surface of the mold. After the flowable material has been deposited over the entire mold surface, and the material has cooled sufficiently to re-harden, the fabricated part can be removed. Since the surface of the part that was in contact with the mold has taken on the shape of the mold, which is the final shape desired, no further machining operations may be necessary.

Figure 1:
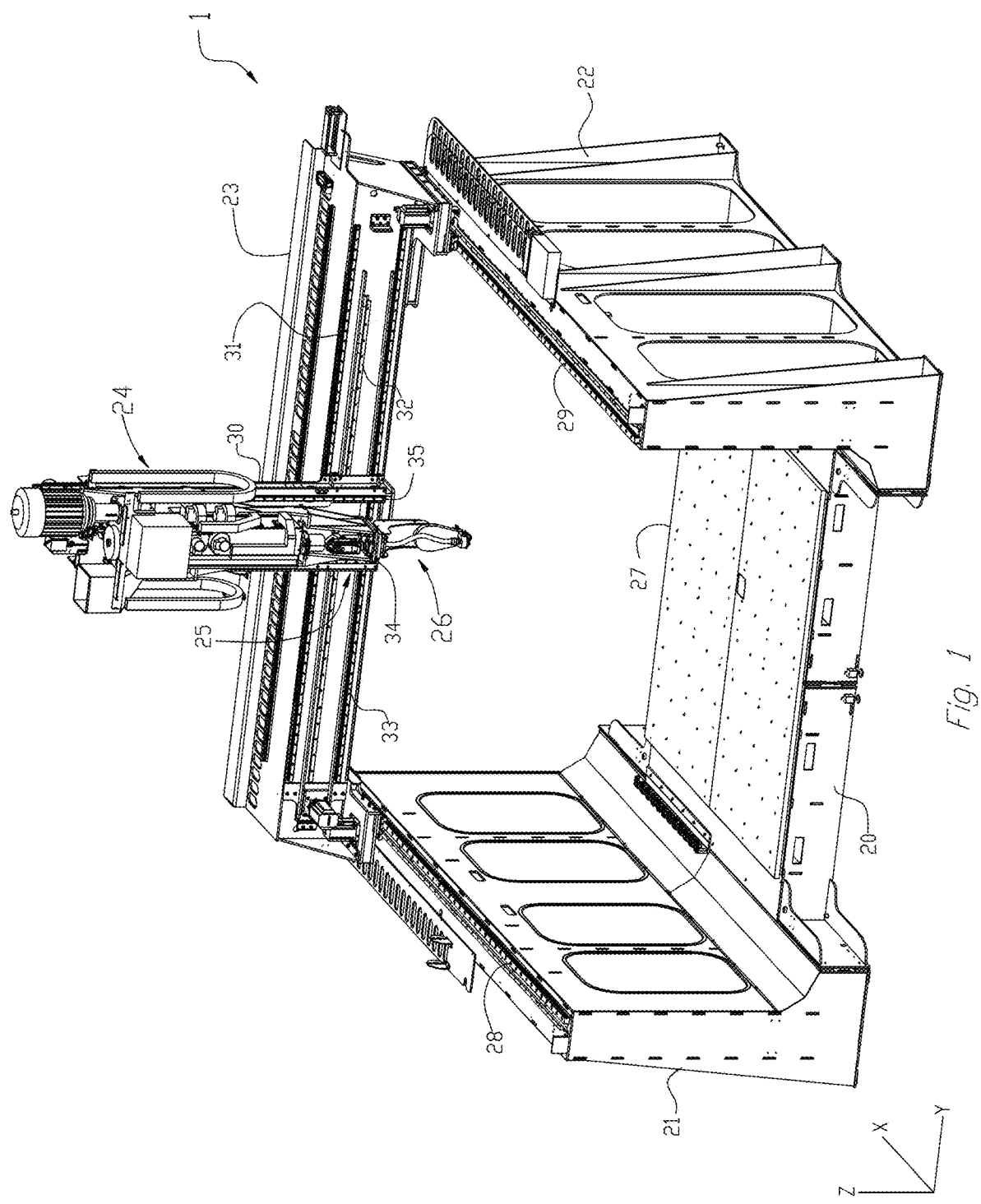
FIG. 1 is a perspective view of an exemplary CNC machine operable pursuant to an additive manufacturing process in forming articles, according to an aspect of the present disclosure.

Referring to FIG. 1 of the drawings, there is illustrated a programmable computer numeric control (CNC) machine 1 embodying aspects of the present disclosure. A controller (not shown) may be operatively connected to the machine 1 for displacing an application head along a longitudinal line of travel or an x-axis, a transverse line of travel or a y-axis, and a vertical line of travel or a z-axis, in accordance with a program inputted or loaded into the controller for performing an additive manufacturing process to replicate a desired component. CNC machine 1 may be configured to print or otherwise build 3D parts from digital representations of the 3D parts (e.g., AMF and STL format files) programmed into the controller. For example, in an extrusion-based additive manufacturing system, a 3D part may be printed from a digital representation of the 3D part in a layer-by-layer manner by extruding a flowable material. The flowable material may be extruded through an extrusion tip carried by a print head of the system, and is deposited as a sequence of beads on a substrate in an x-y plane. The extruded flowable material may fuse to previously deposited material, and may solidify upon a drop in temperature. The position of the print head relative to the substrate is then incremented along a z-axis (perpendicular to the x-y plane), and the process is then repeated to form a 3D part resembling the digital representation.

Machine 1 includes a bed 20 provided with a pair of transversely spaced side walls 21 and 22, a gantry 23 supported on side walls 21 and 22, carriage 24 mounted on gantry 23, a carrier 25 mounted on carriage 24, and an applicator assembly 26 mounted on carrier 25. Supported on bed 20 between side walls 21 and 22 is a worktable 27 provided with a support surface disposed in an x-y plane, which may be fixed or displaceable along an x-axis. In the displaceable version, the worktable may be displaceable along a set of rails mounted on the bed 20 by means of servomotors and rails 29 mounted on the bed 20 and operatively connected to the worktable 27. Gantry 23 is disposed along a y-axis, supported at the ends thereof on end walls 21 and 22, either fixedly or displaceably along an x-axis on a set of guide rails 28 and 29 provided on the upper ends of side walls 21 and 22. In the displaceable version, the gantry 23 may be displaceable by a set of servomotors mounted on the gantry 23 and operatively connected to tracks provided on the side walls 21 and 22 of the bed 20. Carriage 24 is supported on gantry 23 and is provided with a support member 30 mounted on and displaceable along one or more guide rails 31, 32 and 33 provided on the gantry 23. Carriage 24 may be displaceable along a y-axis on one or more guide rails 31, 32 and 33 by a servomotor mounted on the gantry 23 and operatively connected to support member 30. Carrier 25 is mounted on a set of spaced, vertically disposed guide rails 34 and 35 supported on the carriage 24 for displacement of the carrier 25 relative to the carriage 24 along a z-axis. Carrier 25 may be displaceable along the z-axis by a servomotor mounted on the carriage 24 and operatively connected to the carrier 25.

Figure 2:
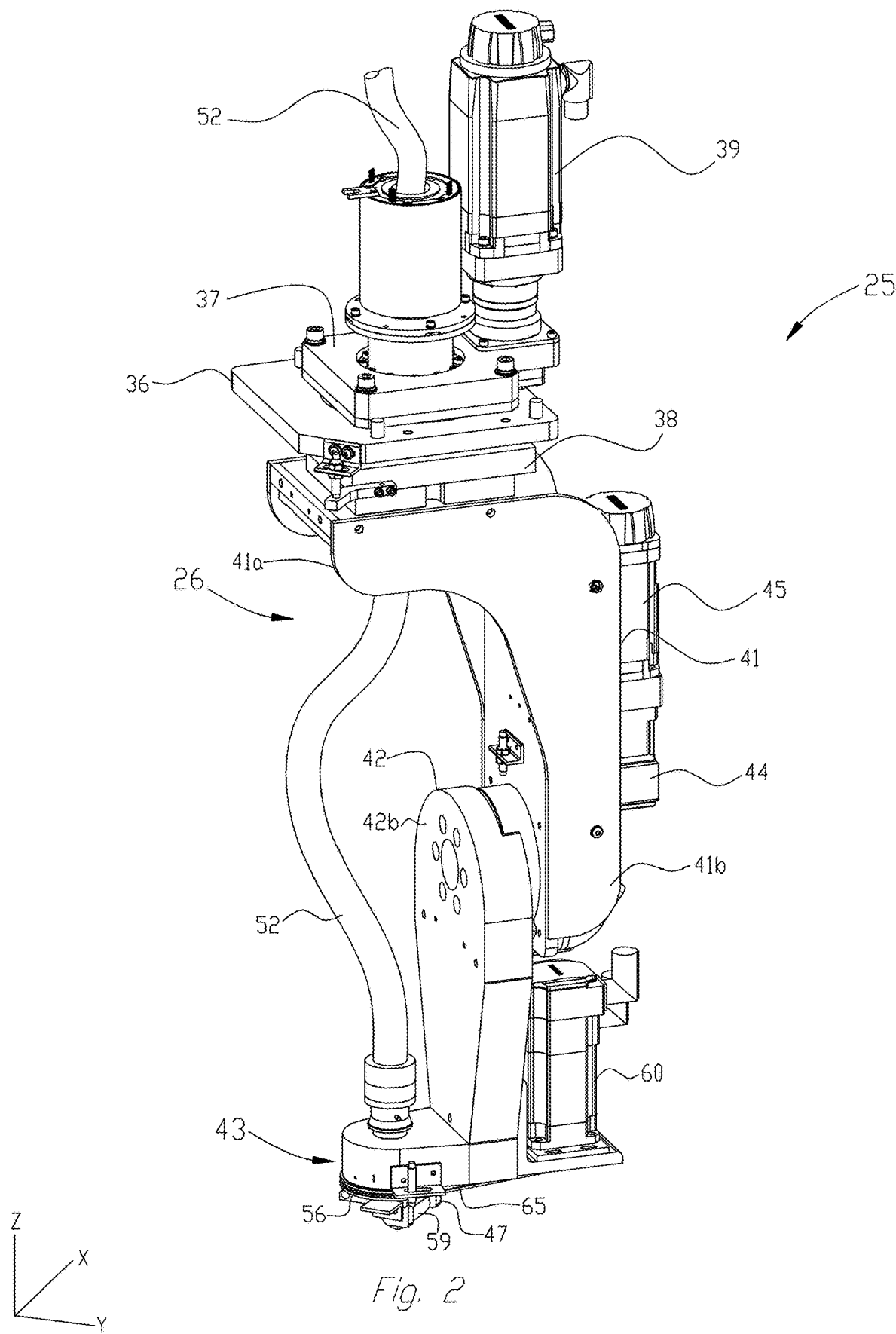
FIG. 2 is an enlarged perspective view of an exemplary carriage and applicator assembly of the exemplary CNC machine shown in FIG. 1.

As best shown in FIG. 2, carrier 25 is provided with a base platform 36, a gear box 37 fixedly mounted on the upper side thereof, and a mounting platform 38 rotatably mounted on the underside of base platform 36. Platform 38 may be provided with openings therethrough disposed along the z-axis of the carrier 25. Gear box 37 may be provided with a gear arrangement having an opening therethrough and disposed coaxially with the aligned openings in gear box 37 and platforms 36 and 38, operatively connected to platform 38 for rotation about the z-axis and rotatable about such axis by means of a servomotor 39 mounted on base platform 36 and operatively connected to such gear arrangement.

Figure 3:
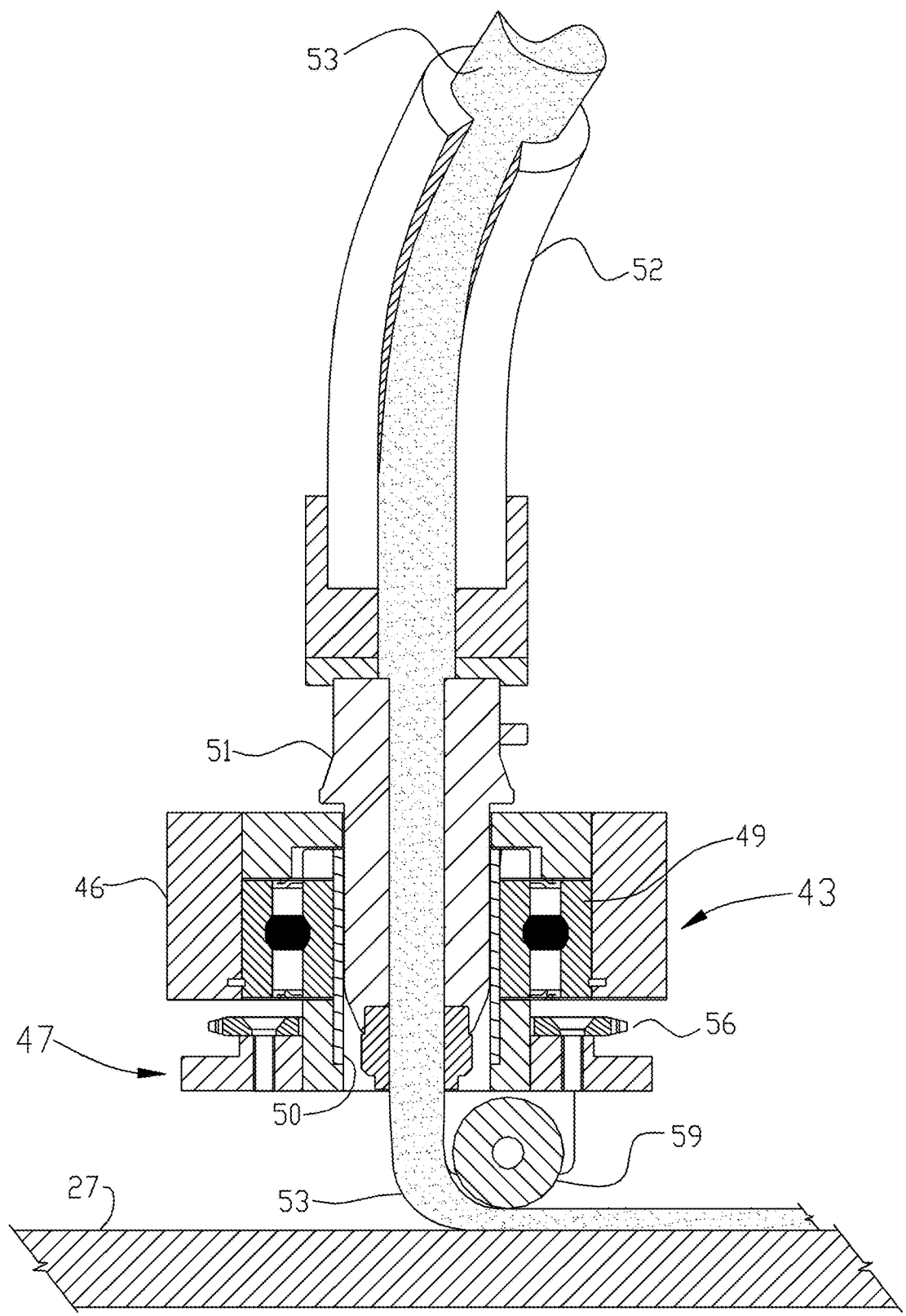
FIG. 3 is an enlarged cross-sectional view of an exemplary material applicator head mounted on a lower end of the applicator assembly of FIG. 2, illustrating a bead of flowable material being extruded through an applicator nozzle onto a work surface, and a roller engaging and compressing a portion of such bead against such work surface, forming a ply of an article being manufactured, according to an aspect of the present disclosure.

Applicator assembly 26 may include an upper segment 41 and a lower segment 42. Upper segment 41 includes a transverse portion 41a secured to the underside of mounting platform 38 for rotational movement about the z-axis. Upper segment 41 may be provided with an opening therethrough along such z-axis, and a depending portion 41b may be disposed substantially laterally relative to such z-axis. Lower segment 42 includes a housing 42b disposed on an inner side of depending portion 41b. Housing 42b may be mounted on a shaft journalled in a lower end of depending portion 41b, intersecting and disposed perpendicular to the z-axis of carrier 25, and further housing 42b may be provided with a laterally projecting application head 43 at a free end thereof. Mounted on a gearbox 44 provided on an outer side of segment portion 41b is a servomotor 45 operatively connected through gearbox 44 to the shaft journalled in portion 41b. Servomotor 45 may be configured for pivotally displacing lower segment 42 in a y-z plane. A material tamping roller 59 (shown in FIG. 3), rotatably mounted in carrier bracket 47, provides a means for flattening and leveling a bead of flowable material (e.g., molten thermoplastic), as shown in FIG. 3. Carrier bracket 47 may be adapted to be rotationally displaced by means of a servomotor 60 (shown in FIG. 2), through a sprocket 56 and drive-chain 65 arrangement.

With continuing reference to FIG. 3, application head 43 may include a housing 46 with a roller bearing 49 mounted therein. Carrier bracket 47 is fixedly mounted to an adaptor sleeve 50, journalled in bearing 49. As best shown in FIGS. 2-3, a conduit 52 consisting of an elongated, flexible material for conveying, e.g., a molten bead of a flowable material (e.g., molten thermoplastic) under pressure from a source disposed on carrier 25 or another source, to applicator head 43, may be fixedly (or removably) connected to, and in communication with nozzle 51. An intermediate portion of conduit 52 may be routed through the openings through gear box 37, support platform 36 and mounting platform 38, and along the z-axis of carrier 25. In use, the flowable material 53 (e.g., thermoplastic) may be heated sufficiently to form a molten bead thereof, which is then forced through conduit 52 and extruded through applicator nozzle 51, to form multiple rows of deposited material 53 in the form of molten beads, as described herein. Such beads of molten material 53 may be flattened, leveled, and/or fused to adjoining layers by any suitable means, such as, e.g., bead-shaping roller 59, to form an article. Even though bead-shaping roller 59 is depicted as being integral with applicator head 43, bead-shaping roller 50 may be separate and discrete from applicator head 43. In some embodiments, the deposited material 53 may be provided with a suitable reinforcing material, such as, e.g., fibers that facilitate and enhance the fusion of adjacent layers of extruded flowable material 53.

In some examples, machine 1 may include a velocimetry assembly (or multiple velocimetry assemblies) configured to determine flow rates (e.g., velocities and/or volumetric flow rates) of material 53 being delivered from applicator head 43. The velocimetry assembly preferably transmits signals relating to the determined flow rates to the aforementioned controller coupled to machine 1, which may then utilize the received information to compensate for variations in the material flow rates.

In the course of fabricating a component, pursuant to the methods described herein, the control system of the machine 1, in executing the inputted program, would operate the several servomotors as described to displace the gantry 23 along the x-axis, displace the carriage 24 along the y-axis, displace the carrier 25 along a z-axis, pivot lower applicator segment 42 about an axis disposed in an x-y plane and rotate bracket 47 about a z-axis thereof, in accordance with the inputted program, to provide the desired end product or a near duplicate thereof. A suitable mold (e.g., mold 62) is provided for depositing flowable material 53 thereon. Such a mold 62 may include at least one surface that is the inverse of the article to be produced, in essence, either a convex mold, or a concave mold, commonly referred to as a male mold or a female mold.

Figure 4:
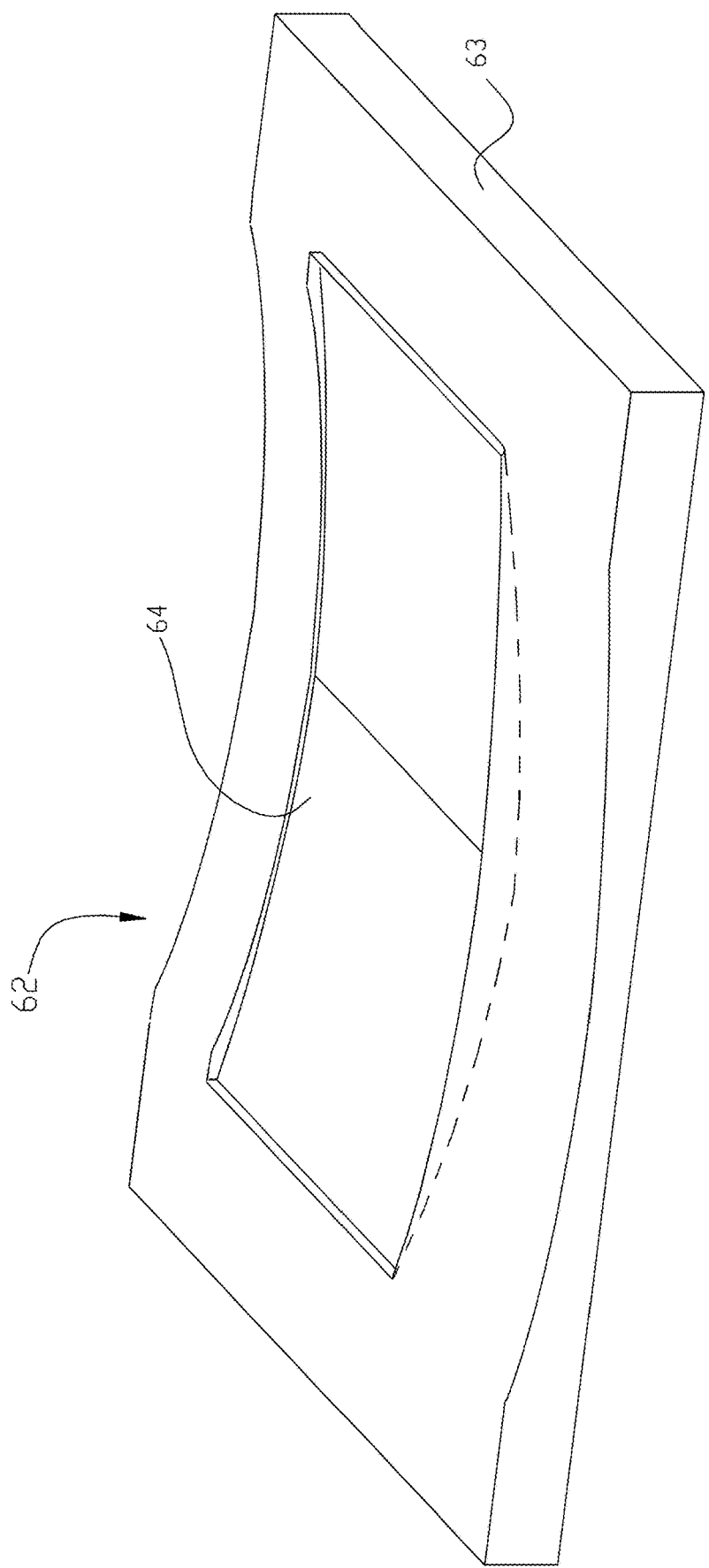
FIG. 4 is a perspective view of an exemplary mold for fabricating components, according to an aspect of the present disclosure.

With reference now to FIG. 4, there is depicted an exemplary female mold 62, with a machined cavity, exemplary of a mold that may be used for forming, e.g. a vehicle engine-compartment lid. Mold 62 may be any suitable mold known in the art, including, but not limited to, molds formed by additive manufacturing or 3D printing processes. In some examples, mold 62 may include a solid body 63 and a cavity 64 formed therein. Cavity 64 may be formed by any suitable means known in the art, including, e.g., machining processes. One or more surfaces of cavity 64 maybe suitably prepared so as to prevent the adhesion of any molten thermoplastic material deposited thereon. For example, the one or more surfaces may be provided with a suitable coating and/or polished or otherwise finished so as to prevent molten thermoplastic from sticking to the one or more surfaces of cavity 64. In some embodiments, mold 62 may be configured to facilitate cooling or warming of material deposited thereon. For example, mold 62 may include one or more channels (not shown) disposed therein for circulation of cooled or heated fluid. The channels may be disposed in any suitable configuration to sufficiently heat or cool material (e.g., flowable material 53) deposited in cavity 64. In addition, or alternatively, mold 62 may be provided with one or more heating elements, such as, e.g., resistive heating elements, configured to warm mold 62 so as control a rate of cooling of material deposited in cavity 64.

Figure 5:
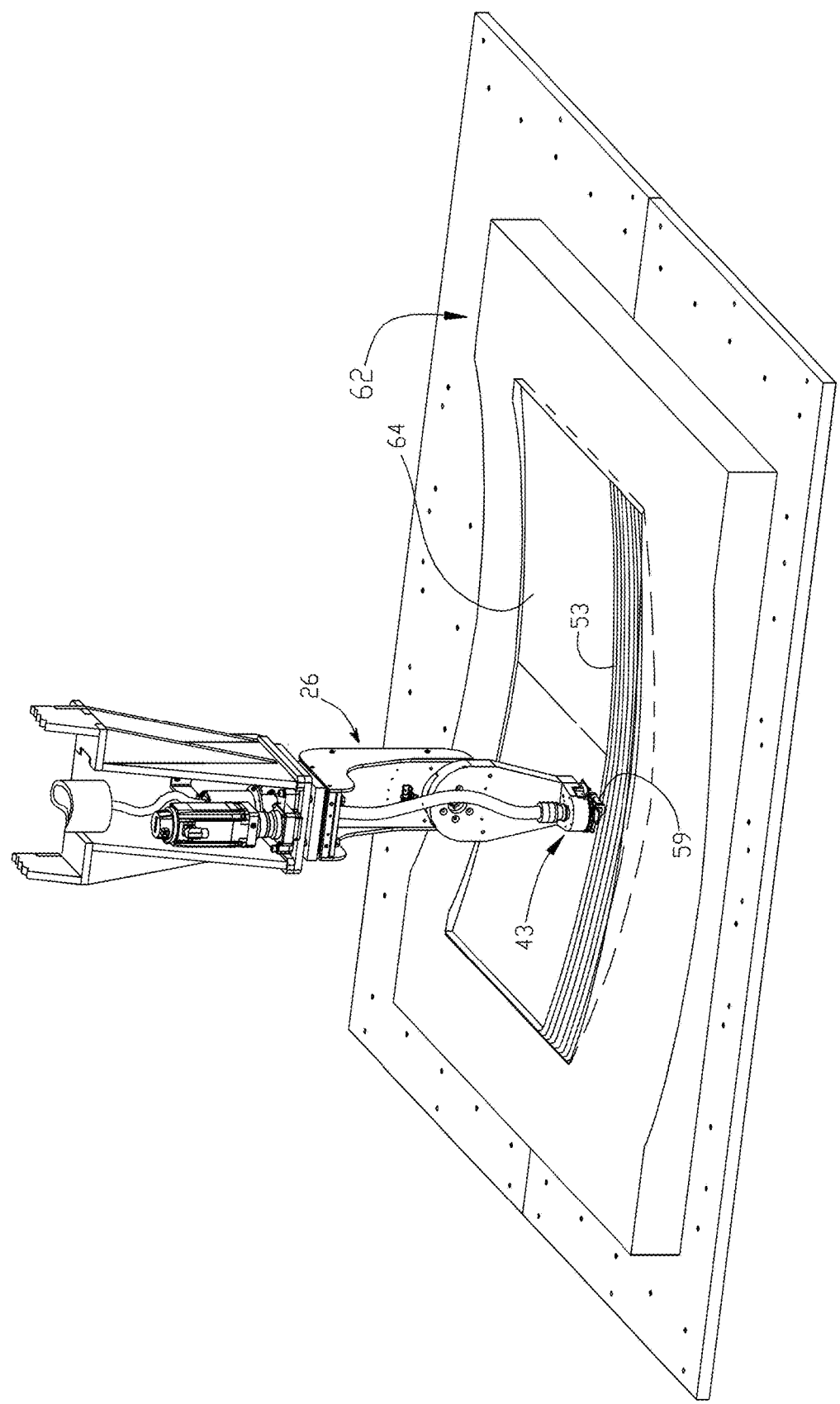
FIG. 5 is a perspective view of the mold of FIG. 4 partially covered with a layer of flowable material deposited therein and receiving an adjoining shaped bead of flowable material from a material applicator head of an exemplary CNC machine.
Figure 6:
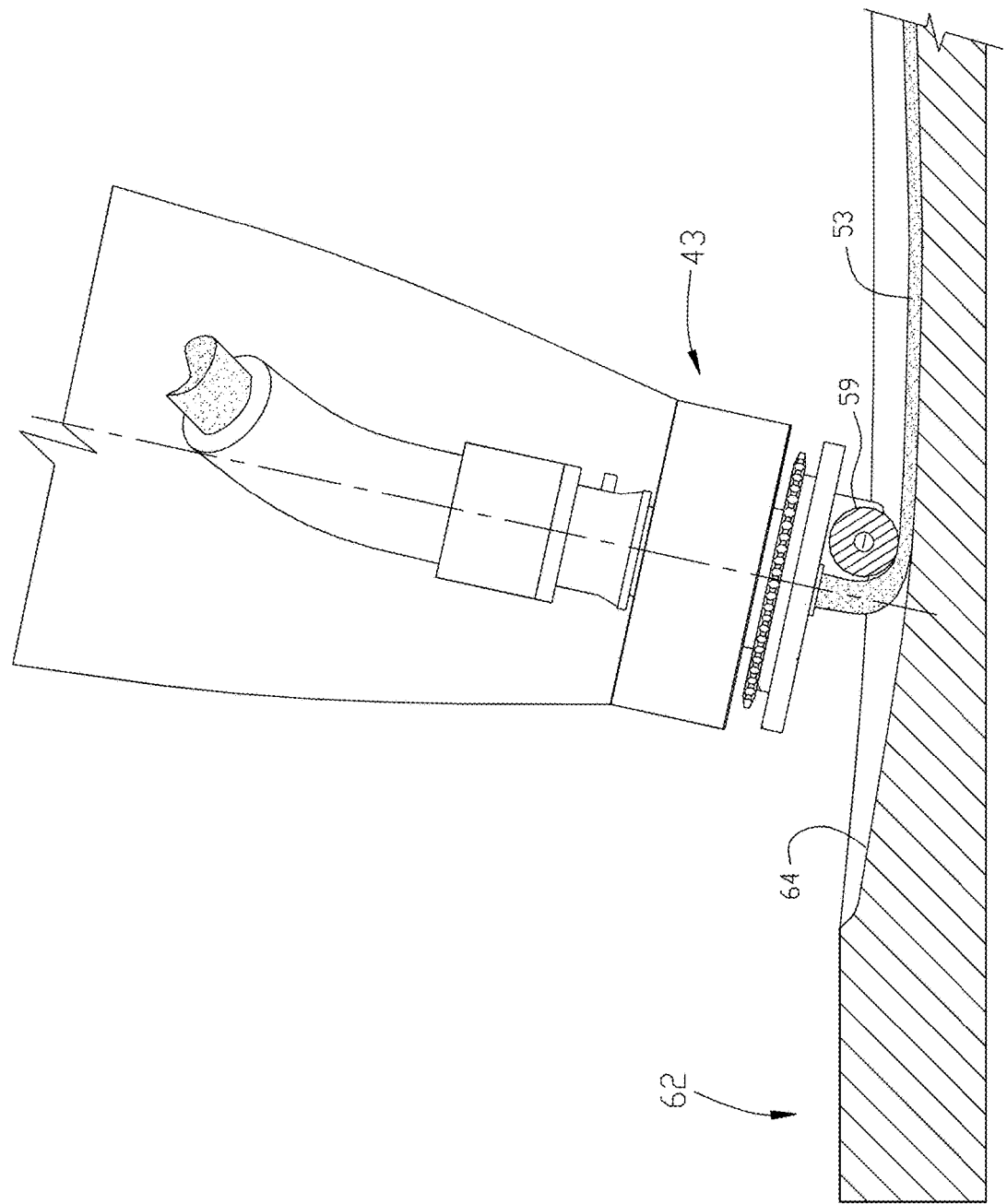
FIG. 6 is a side view of an application head, shown in a position wherein the centerline of the application head is perpendicular to the tangent plane of the contoured surface onto which the molten material is being deposited.

Referring now to FIG. 5, with the machine suitably programmed and activated based on a selected profile relating to a part targeted for fabrication, beads of flowable material 53 may be extruded ahead of the path of roller 59, onto the machined or otherwise suitable prepared surface of cavity 64 of mold 62, accurately replicating the surface thereof and fusing laterally to adjoining, previously deposited beads, forming a single fused layer, thus forming an article that complements one or more surfaces of cavity 64. As best shown in the partial, sectioned view in FIG. 6, the engagement and compression of the bead by roller 59 compresses the bead of extruded material against the surface of said mold, as the application head 43 is pivoted to maintain substantial perpendicularity between the nozzle centerline and the tangent plane of the contoured surface of cavity 64 of mold 62. Stated differently, the application head may be rotated or otherwise displaced to remain perpendicular to a tangent plane of any curve (e.g., concave or convex) of the surface of cavity 64. The surface of an article thusly formed is an inverse duplication of the mold surface onto which it was deposited.

FIG. 7a exemplifies a vehicle engine-compartment lid 80, formed by the methods and apparatus described herein, as viewed from the deposition side 81, while FIG. 7b exemplifies the same item, as viewed from the finished side 82, replicated with substantially no objectionable surface imperfections. If necessary, only minimal machining or suitable finishing processes may be performed around the bottom periphery of such an item, in order to provide for a suitably finished mating surface.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

I claim:

1. An additive manufacturing system, comprising:
a plurality of segments;
a nozzle coupled to a first segment of the plurality of segments at an end portion of the first segment, the nozzle being configurable to deposit a thermoplastic material onto a work surface in a series of layers;
a second segment of the plurality of segments coupled to the first segment;
a first servomotor that is configurable to cause the first segment to rotate;
a second servomotor that is configurable to cause the second segment to rotate; and
a controller that is communicatively coupled to the first servomotor and to the second servomotor and configurable to cause the first servomotor and the second servomotor to change positions of the first segment and the second segment with respect to one another such that an inclination of the nozzle changes,
wherein, the nozzle is configurable such that, when a layer of the thermoplastic material is deposited via the nozzle, the layer has a height that changes along a length of the layer.

2. The additive manufacturing system of claim 1, wherein the first segment includes a pair of opposite lateral sides, and wherein the second segment is operatively coupled to the first segment on one of the lateral sides of the first segment, such that a first portion of the first segment and a second portion of the second segment laterally overlap while the nozzle deposits the thermoplastic material onto the work surface.

3. The additive manufacturing system of claim 1, wherein the controller is further configurable to cause the nozzle to deposit the thermoplastic material for a plurality of layers while the nozzle is angled with respect to the work surface.

4. The additive manufacturing system of claim 1, wherein the controller is further configurable to cause the nozzle to deposit the thermoplastic material at an angle that changes while printing a part that includes the layer.

5. The additive manufacturing system of claim 1, wherein the controller is further configurable to cause the nozzle to deposit the thermoplastic material at an angle that changes while printing the layer by adjusting a position of the nozzle.

6. The additive manufacturing system of claim 1, further comprising a gantry supported by at least two supporting legs, wherein the plurality of segments is operatively coupled to the gantry.

7. The additive manufacturing system of claim 1, further comprising a gantry, wherein the nozzle is moveable along a first horizontal direction, a second horizontal direction, and a vertical direction, the gantry being configurable to translate with the nozzle along the first horizontal direction.

8. An additive manufacturing system, comprising:
an additive manufacturing apparatus including:
a plurality of segments, the plurality of segments being coupled to each other;
a first servomotor of a plurality of servomotors, the first servomotor being configurable to cause a position of a first segment of the plurality of segments to change;
a second servomotor of the plurality of servomotors, the second servomotor being configurable to cause a position of a second segment of a plurality of segments to change; and
a nozzle coupled to the second segment and configurable to deposit a thermoplastic material onto a work surface as a series of layers,
the plurality of servomotors being configurable to change a position of the nozzle along an x-axis, a y-axis, and a z-axis,
the second servomotor being configurable to, when actuated, cause an angle of the nozzle relative to the work surface to change,
wherein the nozzle is configurable to deposit the thermoplastic material to form a layer that has a height that changes along a length of the layer.

9. The additive manufacturing system of claim 8, wherein the plurality of servomotors are configurable to cause the nozzle to deposit the thermoplastic material for a plurality of layers while the nozzle is angled with respect to the work surface.

10. The additive manufacturing system of claim 8, wherein the plurality of servomotors are configurable to cause the nozzle to deposit the thermoplastic material at an angle that changes while printing a part that includes the layer.

11. The additive manufacturing system of claim 8, wherein the plurality of servomotors are configurable to cause the nozzle to deposit the thermoplastic material at an angle that changes while printing a layer by adjusting a position of the nozzle.

12. The additive manufacturing system of claim 8, further comprising a gantry, wherein the plurality of segments is operatively coupled to the gantry.

13. The additive manufacturing system of claim 8, further comprising a movable gantry supporting the plurality of segments.

14. An additive manufacturing system, comprising:
an applicator assembly through which a thermoplastic material is configurable to be extruded, the applicator assembly including a plurality of moveable elements including a first element that is coupled to a second element, the first element having a position that is configurable to be changed with respect to a position of the second element;
a nozzle that is configurable to deposit the thermoplastic material in a series of layers;
a plurality of servomotors for changing the positions of the plurality of elements such that the nozzle moves along a first horizontal direction, a second horizontal direction that is perpendicular to the first horizontal direction, and a vertical direction that is perpendicular to the first horizontal direction and to the second horizontal direction, while thermoplastic material is deposited via the nozzle; and
a controller communicatively coupled to the plurality of servomotors and configurable to control the plurality of servomotors to cause the nozzle to deposit the thermoplastic material in a layer that has a height, measured in the vertical direction, that changes along a length of the layer.

15. The additive manufacturing system of claim 14, further comprising a gantry, wherein the plurality of elements is operatively coupled to the gantry.

16. The additive manufacturing system of claim 14, further comprising a movable gantry.

17. The additive manufacturing system of claim 14, further comprising a work surface onto which the nozzle is configurable to deposit material, the work surface being displaceable along the first horizontal direction.

18. An additive manufacturing system, comprising:
a nozzle that is configurable to deposit a thermoplastic material to form a series of layers;
an applicator assembly including moveable elements, the moveable elements including a first element that is coupled to a second element, the first element having a position that is changeable with respect to the second element to position the nozzle during an additive manufacturing process, the position of the nozzle being changeable from a first position to a second position, the nozzle being configurable to deposit the thermoplastic material while at the first position and while at the second position, the second position forming an angle with respect to a vertical direction;
servomotors for changing positions of the moveable elements and to cause the nozzle to move in a first horizontal direction, in a second horizontal direction that is perpendicular to the first horizontal direction, and in the vertical direction, the vertical direction being perpendicular to the first horizontal direction and to the second horizontal direction, while the thermoplastic material is deposited via the nozzle; and
a support coupled to the applicator assembly for supporting the applicator assembly and the servomotors, the support being displaceable to move the nozzle and the applicator assembly during the additive manufacturing process and thereby increase a size of an area in which the thermoplastic material is able to be deposited via the nozzle.

19. The additive manufacturing system of claim 18, further including a controller that is electrically coupled to the servomotors and configurable to send signals to cause the servomotors to move the nozzle and to move the support.

20. The additive manufacturing system of claim 18, wherein the support includes a member that moves along a gantry.

21. The additive manufacturing system of claim 18, wherein the support includes a member that moves along an upper surface of a floor-standing support.

22. The additive manufacturing system of claim 18, wherein the support is a member that moves along a floor-standing support that is configurable to extend generally parallel to a surface on which the nozzle deposits the thermoplastic material during the additive manufacturing process.

23. The additive manufacturing system of claim 18, wherein the servomotors are configurable to change a position of the nozzle along an x-axis, a y-axis, and a z-axis while the nozzle deposits the thermoplastic material to form a layer that has a height that changes along a length of the layer.

24. The additive manufacturing system of claim 18, wherein the servomotors are configurable to change a position of the nozzle along an x-axis, a y-axis, and a z-axis while the nozzle deposits the thermoplastic material to form a layer that has a height that changes along a length of the layer, and to translate the applicator assembly and the nozzle from a first end of a worktable to a second end of a worktable for increasing the size of the area in which the thermoplastic material is able to be deposited via the nozzle.

25. The additive manufacturing system of claim 18, wherein the support includes a rail that is configurable to extend in a direction that is generally parallel to a work surface on which the nozzle deposits the thermoplastic material.

26. The additive manufacturing system of claim 18, further including a controller that is electrically coupled to the servomotors and configurable to send signals to the servomotors to cause the nozzle to deposit the thermoplastic material for a plurality of layers while the nozzle is angled with respect to a work surface.

27. The additive manufacturing system of claim 18, further including a controller that is electrically coupled to the servomotors and configurable to send signals to the servomotors to cause the nozzle to deposit the thermoplastic material at an angle that changes while printing a part with the thermoplastic material.

28. The additive manufacturing system of claim 18, further including a controller that is electrically coupled to the servomotors and configurable to send signals to the servomotors to cause the nozzle to deposit the thermoplastic material at an angle that changes while printing a layer by adjusting a position of the nozzle.

* * * * *